(12) United States Patent
Yamen et al.

(10) Patent No.: US 8,774,005 B2
(45) Date of Patent: Jul. 8, 2014

(54) CONGESTION CONTROL METHOD AND DEVICES

(75) Inventors: Soner Yamen, Herzogenrath (DE); Arturo Martin De Nicolas, Aachen (DE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 313 days.

(21) Appl. No.: 13/121,014

(22) PCT Filed: Jul. 24, 2009

(86) PCT No.: PCT/EP2009/059567
§ 371 (c)(1),
(2), (4) Date: Mar. 25, 2011

(87) PCT Pub. No.: WO2010/034539
PCT Pub. Date: Apr. 1, 2010

(65) Prior Publication Data
US 2011/0255410 A1    Oct. 20, 2011

Related U.S. Application Data

(60) Provisional application No. 61/100,406, filed on Sep. 26, 2008.

(51) Int. Cl.
*H04J 1/16*    (2006.01)
(52) U.S. Cl.
USPC .......................................................... 370/237
(58) Field of Classification Search
USPC .......................................................... 370/237
See application file for complete search history.

(56) References Cited

U.S. PATENT DOCUMENTS

| 4,799,215 A * | 1/1989 | Suzuki ........................ 370/227 |
| 6,253,146 B1 * | 6/2001 | Hanson et al. ................ 701/414 |
| 6,831,895 B1 * | 12/2004 | Ji et al. ........................ 370/237 |
| 2004/0264377 A1 * | 12/2004 | Kilkki et al. ................. 370/235 |

FOREIGN PATENT DOCUMENTS

| EP | 1 965 579 A | 9/2008 |
| WO | WO 2004/068800 | 8/2004 |
| WO | WO 2004/112323 | 12/2004 |

OTHER PUBLICATIONS

"Traffic Routing" E.170 (Oct. 1992) ITU T Standard in Force (I) International Telecommunication Union, Geneva, CH Oct. 30, 1992. XP017400279.

* cited by examiner

*Primary Examiner* — Hassan Kizou
*Assistant Examiner* — Ashil Farahmand

(57) ABSTRACT

A method for congestion response in a communication system that comprises routing capability over a first type network and a second type network is described. The method comprises: —receiving a congestion indication for resources on a route to a target through the first type network, —storing the congestion indication associated to the route, —upon receiving a subsequent request for initiating a set-up of a call on the route, —checking if a congestion indication exists for the route, and—establishing the call on an alternative route to the target through the second type network if said congestion indication exists.

13 Claims, 5 Drawing Sheets

CONGESTION CONTROL METHOD AND DEVICES

This application claims the benefit of U.S. Provisional Application No.61/100,406, filed Sep. 26, 2008, the disclosure of which is fully incorporated herein by reference.

TECHNICAL FIELD

The present application relates to a method for congestion response in a communication system, to a call control server for a communication system and to a user plane handling node for a communication system.

BACKGROUND

A number of markets are introducing MSS (Mobile Soft Switch) with IP (Internet Protocol) transport while keeping a large part of their TDM (Time Division Multiplex) network untouched for some years to come. As a result, there is a co-existence of IP and TDM transport for Mobile Circuit Core. When an IP network is congested or not available, operators require that, if possible, an alternative TDM route is used instead of simply rejecting the call.

It is possible to handle calls via an alternative TDM network, if a BICC (Bearer Independent Call Control) route is congested, as one can re-select an ISUP (ISDN User Plane) route with TDM transport as an alternative. When a BICC route is up-and-running and the problem is related to the User Plane, the call is rejected by M-MGW (Mobile Media Gateway) e.g. using MBAC (Measurement Based Admission Control) or similar mechanism depending upon the conditions of the User Plane. The term MGW (Media Gateway) is used throughout this text as a non-limiting example for a node which handles the user plane of a call and comprises resources for the user plane handling. If the call is handled by single server, e.g. a Mobile Services Switching Center (MSC) it is still possible for the server to re-route the call to an alternative route. For the case of calls via two or more servers, which is more common, it is too late in the call set up to re-route the call and the call will fail.

A solution is required from markets to improve the situation from several customers.

Existing solution are not good enough for real market issues since:
- When Transport Network is congested, BICC routes are usually still up and running, i.e. a solution is preferable if it does not only consider a scenario in which signaling transport is also congested and hence a BICC route is not available.
- Typically, long distance calls are controlled by two servers, i.e. a solution is preferable if it does not only consider a scenario in which the call is controlled by a single MSC-S (Mobile Services Switching Center Server).

The above is an example of a situation in which a communication system has routing capabilities over two different types of networks.

SUMMARY

It is desired to provide an improved concept of congestion response in a communication system that comprises routing capability over a first type network (e.g. a packet switched network) and a second type network (e.g. a circuit switched network).

This object is achieved by the subject-matter of the independent claims. Some advantageous embodiments are described in the dependent claims.

According to one embodiment, a method for congestion response in a communication system that comprises routing capability aver a first type network and a second type network is described. The method comprises:
   receiving a congestion indication for resources on a route to a target through the first type network,
   storing the congestion indication associated to the route,
   upon receiving a subsequent request for initiating a set-up of call on the route,
   checking if a congestion indication exists for the route, and
   establishing the call on an alternative route to the target through the second type network if said congestion indication exists.

In accordance with this embodiment, if a congestion indication is received for a given route of a first type network, then it is possible to avoid that route for the set-up of subsequent future calls and to re-route these future calls through an alternative route in the second type network if a congestion indication exists. Even if the call whose set-up led to a congestion indication was aborted, the aborting of subsequent calls can be avoided with a simple and easily implemented mechanism, while at the same time efficiently making use of the first and second type networks.

According to another embodiment, a call control server for a communication system that comprises routing capability over a first type network and a second type network is provided. The call control server comprises:
   a receiver for receiving a congestion indication for resources on a route to a target through the first type network,
   a memory for storing the congestion indication associated to the route, and
   a controller arranged such that upon receiving a subsequent request for initiating a set-up of a call on the route:
   checking if a congestion indication exists for the route, and
   establishing the call on an alternative route to the target through the second type network if said congestion indication exists.

According to another embodiment, the method of congestion response and the call control server are able to react to a partial congestion notification, i.e. a notification that relates to a state of partial congestion.

According to another embodiment of the invention, a user plane handling node for a communication system that comprises routing capability over a first type network and a second type network is provided. The node comprises a controller for performing a procedure of partial congestion status identification for a route over said first type network and for generating a partial congestion notification directed towards a call control server of said communication system.

BRIEF DESCRIPTION OF DRAWINGS

The above concepts will become more readily understandable from the following description of more detailed embodiments, which however are only mentioned for illustrative purposes but without limiting effect. Reference will be made to drawings, in which.

DETAILED DESCRIPTION

In the following, the proposed method and devices are described in terms of particular embodiments. However, it should be noted that particular examples are stated merely to illustrate the above general terms of the basic concept. For example, the method and devices could also be applied in the case of an ATM (Asynchronous Transfer Mode) based user plane, or embodiments described using an M-MGW could also be executed using a regular MGW or any other applicable user plane handling node. Equally, call control can be performed by an MSC, an MSC-S or any other applicable call control server.

Figure 1:
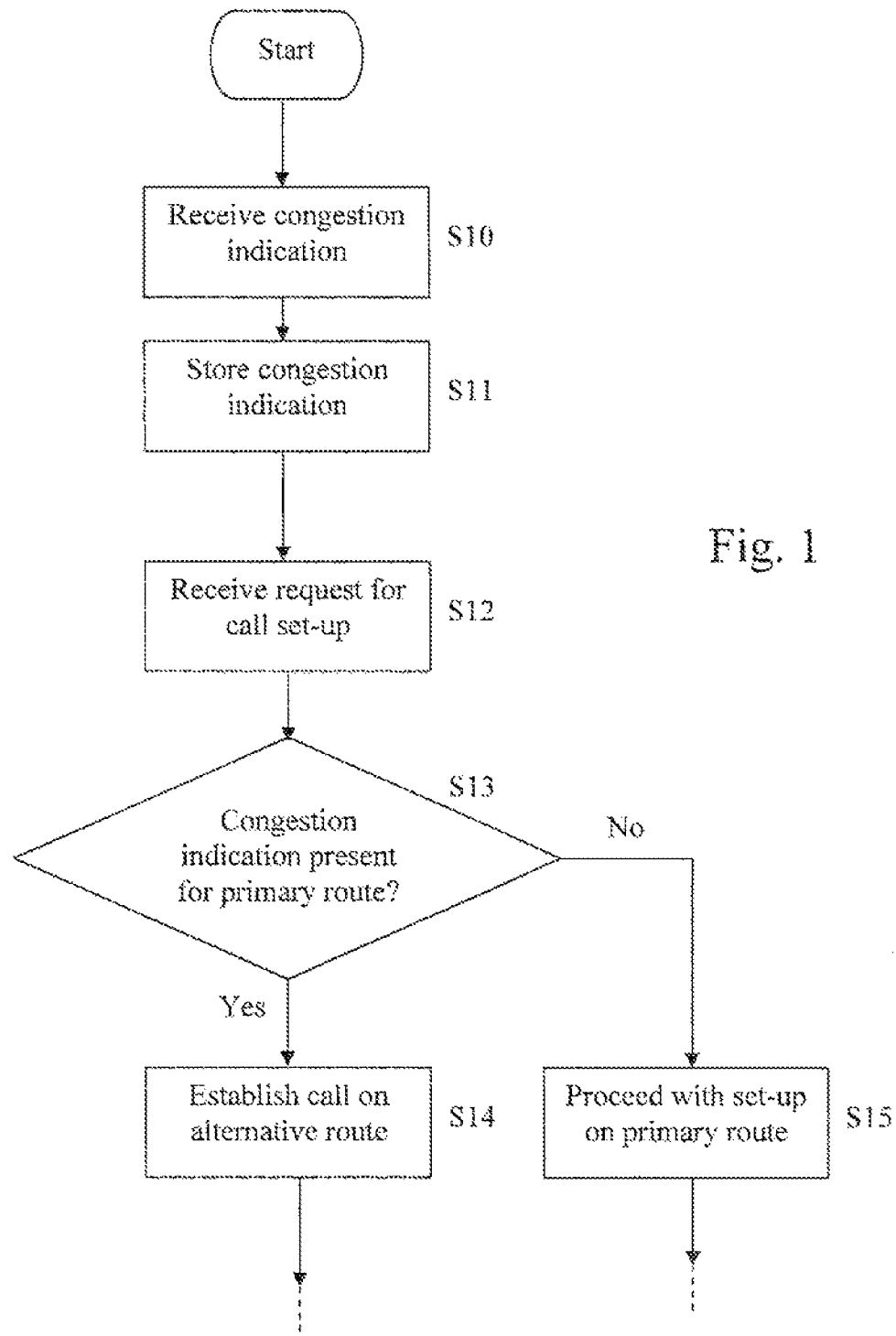
FIG. 1 shows a flow chart of a method embodiment of the present invention.
Figure 4:
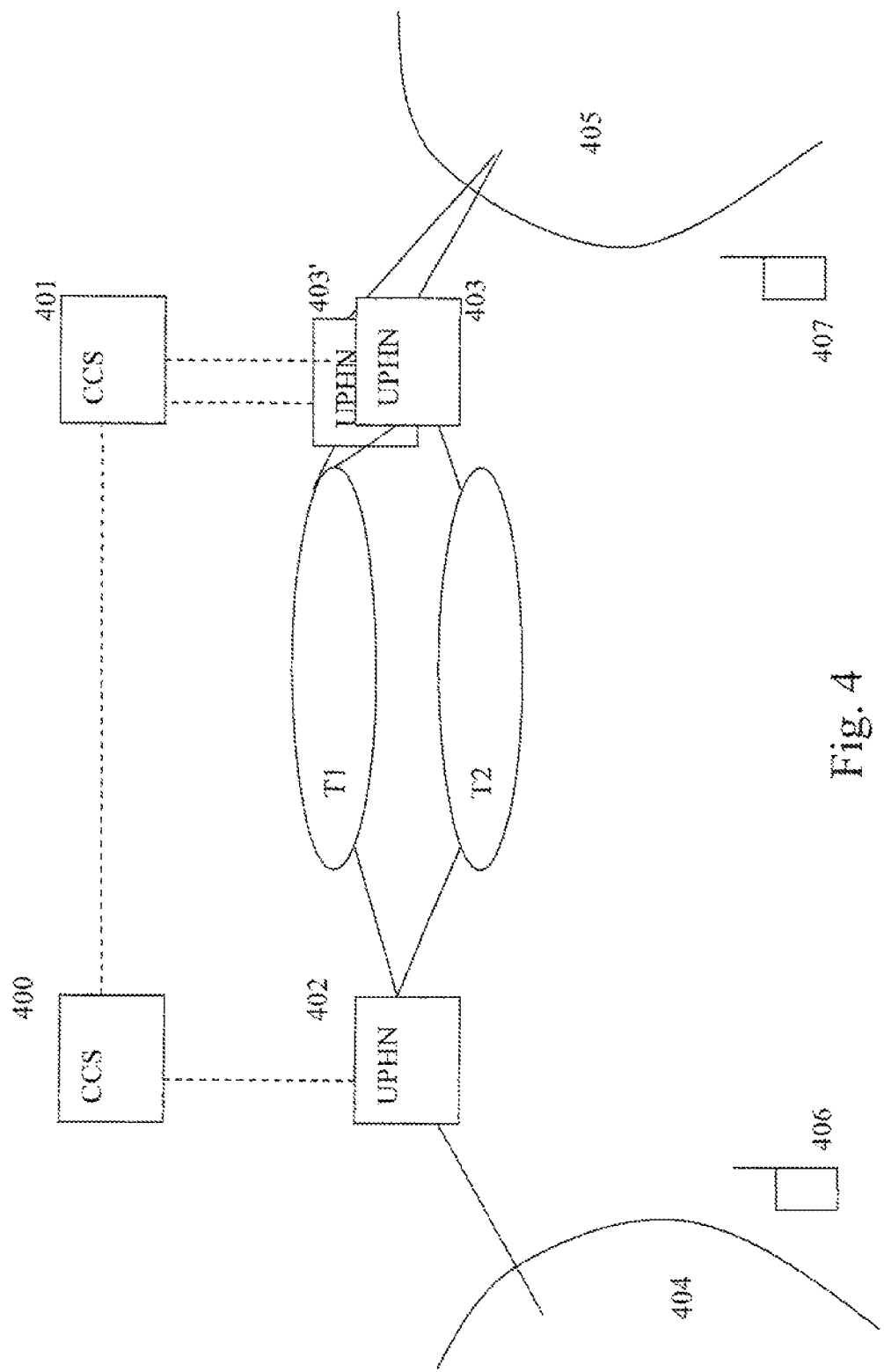
FIG. 4 shows a schematic representation of a communication system to which the present invention can be applied.

FIG. 1 shows a flow chart of a basic method embodiment of the present invention. This method can for example be applied to a system as shown in FIG. 4, in which user plane traffic (represented in solid lines) can pass from a first communication network 404 (e.g. a mobile telephone network or an access network) to a user plane handling node (UPHN) 402 associated with network 404, which in turn can route traffic through a first type network T1 and a second type network T2 towards another UPHN 403 that is in turn associated with another communication network 405 (e.g. another mobile telephone network or another access network). Call control is exercised by respective call control servers (CCS) 400 and 401, which exchange control signalling (represented as dashed lines) with UPHN 402 and 403, respectively. Naturally, the system of FIG. 4 is only an example, and the inventive concept can also be applied to other systems, e.g. having more types of networks than T1 and T2, or where user plane handling and call control are performed in the same node distributed over more than two nodes. Furthermore, a different UPHN may be involved to handle traffic from and to the communication network 402, 404 depending on the networks T1, T2 through which the traffic is routed as indicated e.g. by UPHN 403'.

The method of FIG. 1 comprises a step S10 in which a congestion indication for resources on a route to a target through the first type network is received. A target can be any destination of a call, e.g. a particular terminal, a group of terminals or a certain destination area associated with the route. A route is any means of connecting the call user plane to the target.

The congestion indication is a piece of information suitable for conveying that congestion is present. In the example of FIG. 4, the CCS 400 may e.g. receive such an indication for first type network T1 while attempting to perform call set-up for a requested call from mobile terminal 406. The target can e.g. be mobile terminal 407. The congestion indication can be generated in any suitable or desirable way, e.g. it can come from the UPHN 402 or from CCS 401 in response to the request for resources from CCS 400. It can e.g. be contained in a dedicated message or be part of a larger body of information received during the call set-up process.

In step S11 the congestion indication is stored in association with the route for which congestion was indicated. In the example of FIG. 4, assuming that a given route (e.g. a BICC route) through first type network T1 is indicated as congested, CCS 400 makes a record of the congestion indication in association with the given route. The storing of the congestion indication thus can be accomplished by storing the piece of information as received in step S10 or making a record in any other suitable form that indicates the same informational content.

The process of FIG. 1 may be a part of a larger control process, which is indicated in the figure by the dashed lines before and after steps S10 and S11. There may be further steps (not shown in FIG. 1) that lead to the aborting of the call during the set-up of which the congestion indication was received in step S10. On the other hand, the congestion notification can also be received outside of the context of call set-up, e.g. as a part of a dedicated signalling message originated by a node of the network experiencing congestion.

According to the present embodiment, there are in any case further steps such that if at a later time a subsequent request for initiating set-up of a call is received (S12), it is checked in step S13 whether a congestion indication exists for the primary route associated with the call. The primary route is any route initially associated with the requested call, e.g. based on a routing table. If said congestion indication exists, then the call is established on an alternative route to the target through the second type network, e.g. network T2 in FIG. 4, see S14.

If no stored congestion indication is present, e.g. because steps S10 and S11 were not invoked as no congestion indication was received previously or because a record clean-up mechanism deleted a stored congestion indication, then the procedure continues with the set-up on the primary route, S15. The mentioned record clean-up mechanism can be time based, e.g. stored congestion indications are deleted if no renewed indication is received within a given time period, and/or based on positive signalling, e.g. based on the receipt of an indication that congestion is not or no longer present. As a time based example, it is e.g. possible to set a timer for a Congested Interval $T_{RC}$ each time that a congestion indication is stored for a route. The length of the Congested Interval $T_{RC}$ can be on the same order of magnitude as the measurement interval for MBAC, e.g. a few seconds. For example, the value can be equal to 2 s.

For example, for IP bearers, the discovery of congestion is primarily done based on the Measurement Based Admission Control (MBAC) in the MGW at the reception of the "IPBCP Request" and "Accept" messages. Sometimes the discovery can occur at a later stage, e.g. if Nb initialization fails.

When the MGWs involved in the call are controlled by different MSC servers, at the time of discovery of congestion as described above, BICC IAM (Initial Address Message) and APM (Application Transport Mechanism) messages have already been exchanged between the two servers. The fallback to another route is no longer possible for that call. Thus, the proposed method is to divert subsequent calls to alternative routes, once congestion is detected, until it is considered solved.

In accordance with this general embodiment, if a congestion indication is received for a given route of a first type network, then it is possible to avoid that route for the set-up of subsequent future calls and to re-route these future calls through an alternative route in the second type network if a congestion indication exists. Even if the call whose set-up led to a congestion indication was aborted, the aborting of subsequent calls can be avoided with a simple and easily implemented mechanism, while at the same time efficiently making use of the first and second type networks.

The first and second type networks can be arranged in any suitable or desirable way. For example, the first type network may be a packet switched network and the second type network may be a circuit switched network. The specific mechanisms and transmission principles underlying the first and second type network may also be chosen in any suitable or desirable way. For example, the first type network may be an Internet Protocol, network and/or an Asynchronous Transfer Mode network, while the second type network may e.g. a Time Division Multiplex network. Independently of the transport protocols used in the first and/or second type network, the call control servers and user pane handling nodes may handle the call as circuit-switched traffic carried by the respective transport protocol.

Thus, in the case of using a packet switched network as the first type network and a circuit switched network as the second type network, an embodiment of the method can be summarized as:
  receiving a congestion indication for resources on a route to a target through the packet switched network,
  storing the congestion indication associated to the route,
  upon receiving a request for initiating a set-up of a call on the route,
  checking if a congestion indication exists for the route, and
  establishing the call on an alternative route to the target through the circuit switched network.

The method of FIG. 1 can be performed in any suitable node or set of nodes. For example, the described steps may be performed in a call control server of said communication system, e.g. CCS 400 and/or CCS 401 of FIG. 4. The congestion indication can be received from a UPHN, e.g. CCS 401 can receive the congestion indication from UPHN 402. Equally, the congestion indication can be received from another CCS, e.g. CCS 400 may receive the congestion indication from GCS 401, which in turn may have received it from UPHN 403. The latter situation of one CCS receiving a congestion notification from another CCS can occur if a call is being controlled by more than one call control server.

The procedure for generating the congestion indication can be chosen in any suitable or desirable way. For example, the congestion indication may be generated if a congestion status at a user plane is detected. In this way, at least a part of the procedure for generating the congestion indication can be performed in a user plane handling node. The congestion indication may also be generated in the event of a loss of connectivity between the user plane and the control plane. In this way, at least a part of the procedure for generating the congestion indication can be performed in a call control server. For example, if CCS 401 in FIG. 4 identifies a loss of signalling connectivity to UPHN 403, it can send a congestion indication to CCS 400, thereby triggering a rerouting of subsequent calls.

In the case of FIG. 4, the congestion indication would have to indicate a congestion for all traffic passing through UPHN 403, such that the rerouting would have to be arranged to avoid UPHN 403 and thus possibly use a third network (not shown, in FIG. 4) or a further UPHN (not shown in FIG. 4) connected to one or both T1 and T2 as well as communication network 405. It is thus evident that the inventive mechanism using congestion indications is not limited to applications where user plane congestion is present, but can be applied in any context in which re-routing at least of subsequent calls is desirable, in view of a disturbance in a part of the overall communication system.

The condition under which a node of the network issues a congestion indication can be chosen in any suitable or desirable way. For example, UPHNs can regularly monitor the congestion situation at the user plane and send corresponding messages containing a congestion indication to a CCS if congestion is detected.

Equally, a congestion indication may be issued as a part of the call set-up procedure. For example, the procedure for generating a congestion indication may comprise the steps of:
  receiving a request for initiating a set-up of a call on a route to the target through the first type network,
  seizing resources for a bearer of the call, and
  determining a congestion when seizing the resources.
In other words, if during call set-up a seizing of resources is disturbed in predetermined way, then this is taken by the CCS as a congestion indication.

For example, in the case that the user plane handling node is a Media Gateway, the congestion status identification procedure may comprise generating a congestion indication if one or more of the following cases:
  an Internet Protocol connection request is rejected by a Measurement Based Admission Control function,
  an Internet Protocol connection request is rejected by a Static Admission Control function,
  a User Plane Nb framing protocol can not be correctly initialized.

Figure 6:
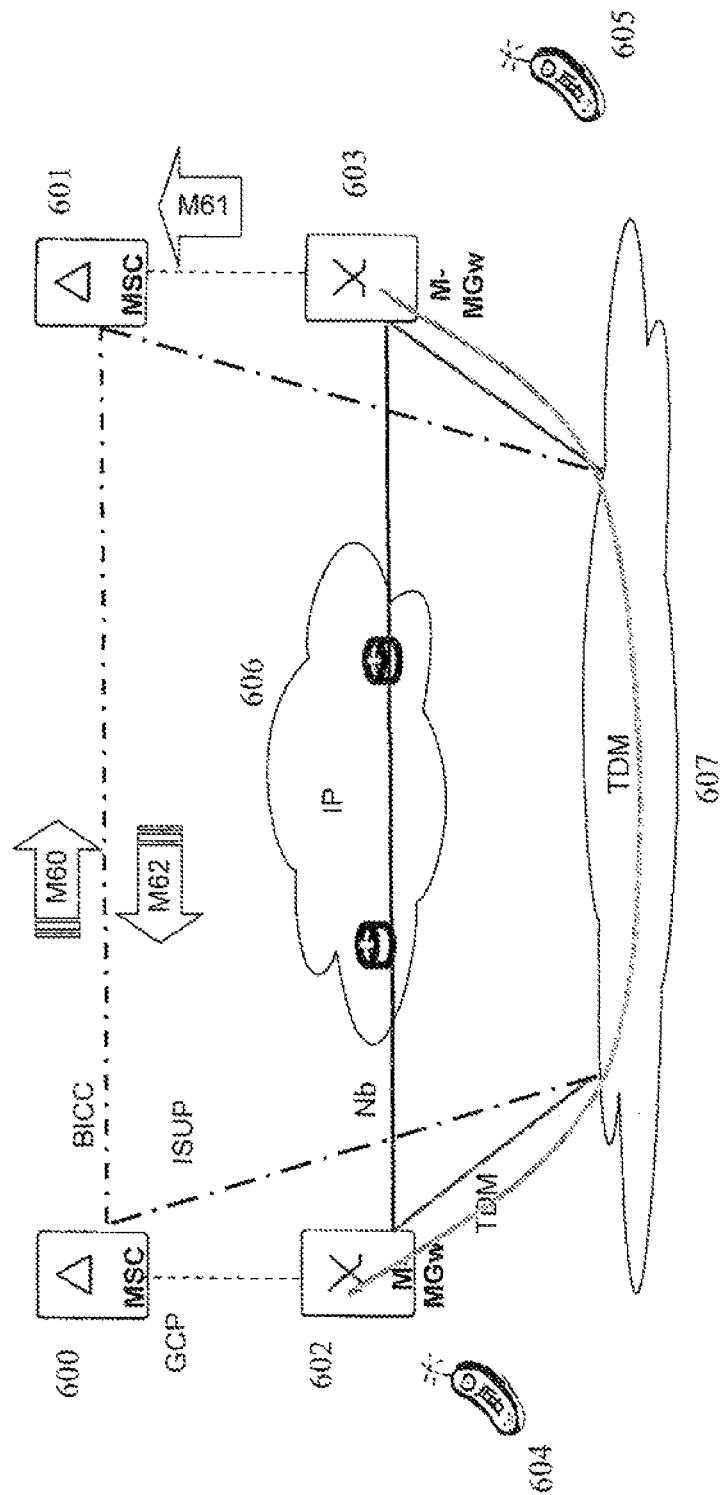
FIG. 6 shows a schematic representation of another communication system to which the present invention can be applied.

A specific example for forward bearer set-up is shown in FIG. 6. Reference numeral 600 and 601 relate to MSCs or MSC-Ss as examples of CCSs. Reference numerals 602 and 603 relate to MSWs or M-MGWs as examples of UPHNs. Reference numerals 604 and 605 refer to mobile terminals, 606 refers to an IP network as an example of a first type network and 607 refers to a TDM network as an example of a second type network. As indicated by the clouds representing interconnecting networks, other devices, e.g. IP routers, may forward the user plane information between the MGWs. For simplicity, known signalling and known control connections between originating and terminating servers as well as originating and terminating MGWs of the calls and the originating and terminating user equipment, represented by mobile phones, are omitted.

Like in FIG. 4, solid lines symbolize user plane traffic, whereas dashed lines symbolize control signalling connections are in some cases also indicated.

Internal processing of nodes associated with the calls is indicated as far as it corresponds to the proposed method while call handling known in the prior art and well-known to the skilled person is omitted for simplification.

The MSC-S 600 initially receives a set-up request for a call from mobile terminal 604 to mobile terminal 605 and selects a BICC route in dependence thereon, for routing the call through IP network 606. It then sends an Initial Address Message (IAM) M60 to MSC-S 601, which in turn triggers a Measurement Based Admission Control (MBAC) in MGW 603. Alternatively, a Static Admission Control (SAC) at the MGW 603 may be performed. In the example, it is assumed that MGW 603 detects a disturbance indicative of congestion, e.g. the packet loss rate is higher than a predetermined threshold. As a result, MGW 603 sends a reject message M61 to MSC-S 601, which in turn sends a message M62 comprising a congestion indication to MSC-S 600. As a consequence MSC-S 600 marks the outgoing BICC route as "User Plane congested" for a certain time. During the time the route is marked as "User Plane congested", the MSC-S shall be able to use alternative outgoing routes, particularly ISUP/TDM routes via TDM network 607.

If congestion is detected in a succeeding node and when forward bearer set-up from MSC-S 600 is used and congestion is detected by the MGW 603 controlled by the succeeding MSC-S 601, this node 603 will send a new notification to the previous user plane node 602 to indicate the congestion, for example in a tunnel in BICC via servers 601 and 600, and node 602 will send a notification of congestion to MSC-S

600. Hence MSC-S 600 can act on congestion as if it is reported by own M-MGW 602. Furthermore, node 603 may send a congestion notification to server 601, which in turn may send a release message comprising a cause code to preceding server 600.

The reception of this cause code will allow the MSC to mark the outgoing BICC route as "User Plane congested".

In case of backward bearer set-up, the succeeding node heeds to release the call. It is suggested to use a dedicated cause code to inform the previous node about the congestion. Other congestion cases are handled similarly; just different cause codes are used.

According to a further embodiment, the system comprises a procedure of partial congestion status identification for generating a partial congestion notification. A partial congestion notification can e.g. be associated with identifying a partial congestion status, i.e. a status that indicates not full congestion but a lesser degree. For example, a partial congestion status can be identified if an observed packet loss ratio exceeds a predefined limit. This limit is preferably lower than the above mentioned predetermined threshold associated with full congestion.

Similar to the congestion indication, the partial congestion notification can be stored as a piece of information as received or in any other suitable form that indicates the same informational content. The partial congestion notification can be chosen to reflect various degrees of congestion, e.g. different percentages, and a congestion indication can thus be expressed as a specific partial congestion notification, namely for full or 100% congestion.

In this embodiment, the proposed method includes a proactive handling in order to alleviate congestion situations in an early stage. In the terms of the basic concept described above, the congestion indication may indicate a partial congestion, i.e. while it is presently still possible to establish calls along the route, a present status of the resources indicates that congestion may be imminent. In this case, it is an option to establish not all calls along the alternative route, but only a fraction of the calls. This will be explained in more detail based on the following examples. Reference again be made to the structure exemplified in FIG. 6, but the basic concept of this embodiment is naturally not limited thereto.

Similar to what was described above, MSC-S 600 receives a set-up request, selects a BICC route, sends an IAM to MSC-S 601, which in turn e.g. controls M-MGW 603 to perform MBAC. When applying MBAC, the M-MGW 603 may observe if the packet loss ratio is above a predefined limit, under the threshold to admit new connections. The M-MGW 603 shall be able to inform the MSC-S 601 with a new event that the IP network towards a certain destination is getting congested, i.e. in this case message M61 shown in FIG. 6 provides this information. This can be based on a) the observation that the packet loss ratio exceeds the predefined limit and shall be done at the time MBAC is applied and b) on the monitoring of the DSCP (Differentiated Services Code Point) octet in the IP header. This notification can use a new event which is also denoted ipcong (indicating partial congestion on IP) below.

One option for communicating congestion to a MGW is to set bits in the well-known DSCP field of the IP header, e.g. by another MGW, if congestion is detected.

The MGW sends the ipcong notification to the MSC-S in connection with the call establishment. At the point it time when MBAC is applied, MGW observes the level of packet loss ratio, as this is normally done, but now, if the MSC-S is adapted to process the ipcong event, the MGW will not only verify whether the traffic is below the threshold to admit more calls (i.e. the full congestion threshold), but also if the predefined packet loss ratio limit level is exceeded, or if the DSCP octet re-marking indicates a pre-congestion situation. If so, the MGW sends a Notify with the ipcong event.

The MSC-S marks an outgoing BICC route as "User Plane partially congested" for a certain time when a connection request is accepted by the Measurement Based Admission Control function in the MGW, but a notification is received from the MGw indicating that there are signs of a certain congestion level in the IP bearer network, e.g. if a specified loss rate of data packets is detected.

During the time the route is marked as "User Plane partially congested," the MSC-S shall be able to use alternative outgoing routes for a percentage of the calls that would normally be addressed to the partially congested route. In this way, congestion is alleviated without totally blocking the route for new calls.

With respect to congestion levels and handling of the calls during congestion, a congestion notification will be processed by the originating MSC-S before continuing with the call establishment. If the route was not marked as "User Plane congested", the MSC will mark it now and a BICC Controlled User Plans Congested Interval $T_{RC}$ will be started. In this solution, the route will also be marked with a Traffic Diversion level TDLi that will determine the percentage of calls that will be diverted to an alternative route during the $T_{RC}$ interval. The "i" indicates different diversion levels, a higher value of i indicating a higher percentage of diverted calls. If, instead of an ipcong event, a congestion detected by MBAC is received, the Traffic Diversion level should be set to the maximum (100%).

The length of the Congested Interval $T_{RC}$ can be on the same order of magnitude as the measurement interval for MBAC, e.g. a few seconds. For example, the value can be equal to 2 s.

The TDLi can depend on:
- The type of congestion indication received: if it is a rejection caused by MBAC, or in more general terms an admission control for a specific route, the maximum Traffic diversion level should be applied since no change in the congestion status can be expected during the next time interval $T_{RC}$ due to the nature of the detection mechanism. If it is an ipcong event or UP (User Plane) initialization failure, the diversion level applied in the previous interval can be increased step-wise. There exist other mechanisms that are used today to detect congestion at user plane level. Based on the nature of the different mechanisms it may be appropriate to apply a maximum traffic diversion level or to increase the diversion level. For example, a so called Static Admission Control (SAC) mechanism base on the complete volume of IP traffic in the MGW could also reject the establishment of a new call. For this type of rejection an increase in the diversion level is appropriate.
- The traffic diversion levels of the previous interval, i.e. if congestion is observed over consecutive intervals, the traffic diversion level is increased. Likewise, an interval with no congestion allows reducing the diversion level.

When the Route Congested Interval $T_{RC}(n)$ expires, a new Interval $T_{RC}(n+1)$ can be started in which the diversion level can for example be:
- The same as in the previous interval $T_{RC}(n)$ if the previous interval was a first congestion interval i.e. n=1
- TDLi+1, TDLi being the level applied in $T_{RC}(N)$ if congestion indication was received during $T_{RC}(n)$ and n>1

TDLi−1, being the level applied in $T_{RC}(n)$ if no congestion indication was received during $T_{RC}(n)$ and n>1. If TDLi−1=0 then there is no need to supervise a new interval and n is reset to 0.

If while the TDL is smaller than the maximum, the congestion indication received is a rejection caused by MBAC, this may always start or restart a new Route Congested Interval $T_{RC}$. The TDL will be kept to maximum during two $T_{RC}$ intervals. In the third interval, the traffic diversion level can be reduced by one level.

Figure 5:
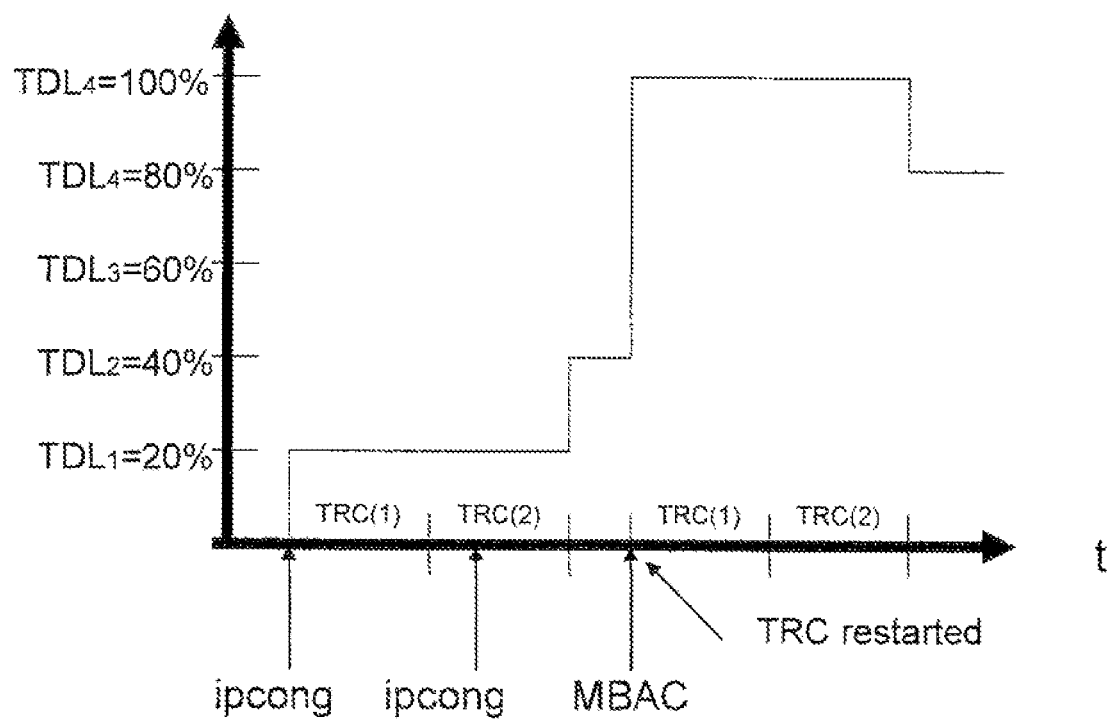
FIG. 5 shows a graph indicating an example of the adaptation of Traffic Diversion Levels (TDL) over time.

FIG. 5 shows en example of this behaviour, in which five TDL levels exist with 20% intervals between each of them. As can be seen, ipcong events lead to a gradual adjustment of TDL, whereas an MBAC rejection event (congestion indication) leads to a resetting of TRC and to an adjustment of TDL, to 100%.

In general, the predetermined intervals $T_{RC}$ are monitored, and at each expiration of one of the intervals, the traffic diversion level can be updated.

One advantages of the invention is that operators can use their existing TDM networks to provide alternative routes when the new IP network is congested.

The term BICC Controlled User Plane Congested Interval (TRC) is used to express an interval of time in which the user plane controlled by an outgoing BICC route is marked as congested, or partially congested, and all or a percentage of the calls are diverted to alternative routes.

The term Traffic Diversion Level (TDL) is used to indicate a percentage of calls that are routed to another route during a Route Congested Interval. The levels proposed are e.g. 0, 20%, 40%, 60%, 80% and 100%.

In accordance with an embodiment, a route associated with a partial congestion notification is marked as partially congested, and during a time that the cute is marked as partially congested, alternative routes are used for a percentage of calls addressed to that route. Preferably, the route associated with the partial congestion notification is marked with a traffic diversion level that corresponds to that percentage. Thus, if the TDL is e.g. 40%, then 40% of traffic is re-routed to alternative routes.

The above described methods can be embodied in any suitable form. For example, the invention can be embodied in the form of a computer program comprising computer code parts arranged for performing a described method when executed on a server of said communication system. The invention can also be embodied in a computer program product comprising such a computer program.

Figure 2:
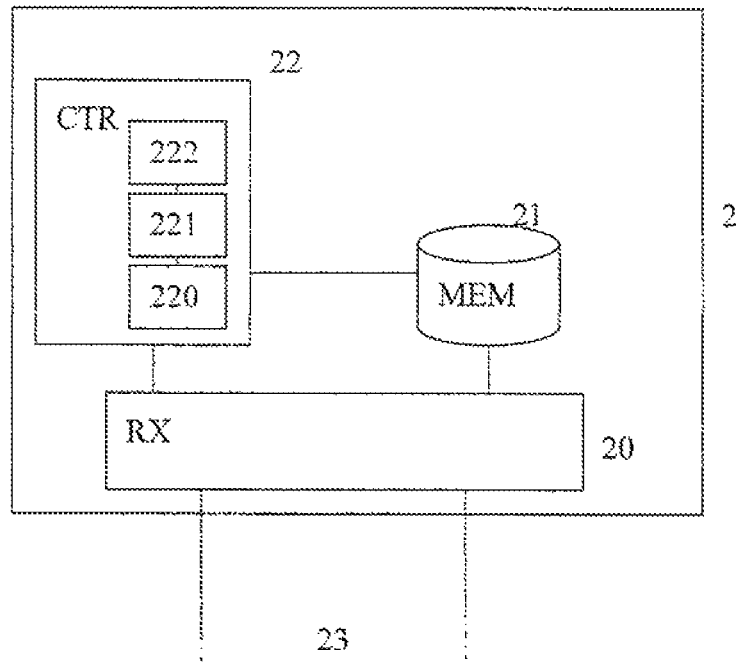
FIG. 2 shows a schematic diagram of a call control server according to an embodiment of the present invention.

Furthermore, the invention can also be embodied as a device suitable to be used in the above methods. For example, the invention can thus also be embodied in a call control server, such as a MSC or MSC-S, for a communication system that comprises routing capability over a first type network and a second type network, like CCSs 400, 401, 600 and 601 described above. FIG. 2 shows a schematic block diagram of such a call control server 2, comprising a receiver 20 for receiving communications from other nodes and servers via lines 23, a memory 21 comprising programs and for storing received information, and a processor or controller 22 for controlling the operation. The receiver 20 is arranged for receiving a congestion indication for resources on a route to a target through the first type network. Memory 21 is arranged for storing the congestion indication associated to the route. Controller 22 is arranged such that upon receiving a subsequent request for initiating a set-up of a call on the route:

checking if a congestion indication exists for the route, and establishing the call on an alternative route to the target through the second type network if said congestion indication exists. Further known elements of call control servers are omitted for simplicity.

The controller 22 may be arranged in any suitable or desirable way. For example, it may comprise one or more of
- a message Manager 220 for handling messages received by the receiver 20, including elements for recognizing a congestion indication and controlling a storage operation of a congestion indication in memory 21;
- a congestion indication discriminator 221 for checking whether a congestion indication is present in memory 21; and
- a route manager 222 for establishing a call on a primary route or an alternative route in dependence on output from the congestion indication discriminator 221.

Controller 22 may be a programmable processor. As such, one or more of the message manager 220, the congestion indication discriminator 221, the route manager 222 and further control components may be provided as computer code parts of a computer program executed on the processor. However, these elements may equally be dedicated hardware devices.

Figure 3:
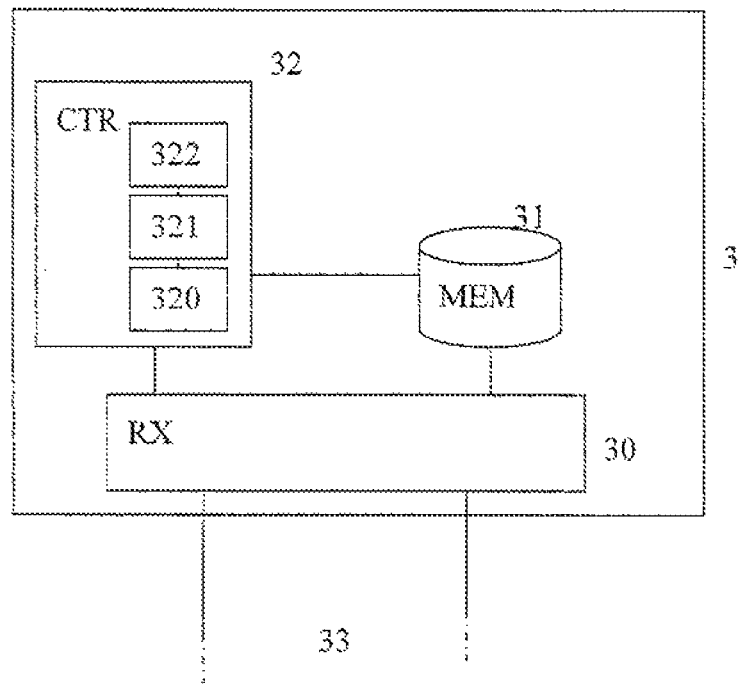
FIG. 3 shows a schematic diagram of a user plane handling node according to an embodiment of the present invention.

The invention can furthermore be embodied in a user plane handling node, e.g. a MGW, where FIG. 3 shows a schematic block diagram. The user plane handling node 3 can have is similar structure as server 2 of FIG. 2, i.e. comprise a receiver 30 for receiving communications from other nodes and servers via lines 33, a memory 31 comprising programs and for storing received information, and a processor or controller 32 for controlling the operation. The user plane handling node 3 is arranged for a communication system that comprises routing capability over a first type network and a second type network. Controller 32 is arranged for performing a procedure of partial congestion status identification for a route over said first type network and for generating a partial congestion notification directed towards a call control server of said communication system. Further known elements of user plane handling nodes are omitted for simplicity.

The controller 32 may be arranged in any suitable or desirable way. For example, it may comprise one or more of
- a traffic manager 320 for handling traffic received by the receiver 30, including elements for processing said traffic and forwarding it, and for controlling a storage operation in memory 31;
- congestion detector 321 for identifying the presence of a congestion status or partial congestion status for a route of a network connected to the user plane handling node 3; and
- a notification generator 322 for generating a congestion indication and/or a partial congestion notification to be directed towards a call control server.

Controller 32 may be a programmable processor. As such one or more of the traffic manager 320, the congestion detector 321, the notification generator 322 and further control components may be provided as computer code parts of a computer program executed on the processor. However, these elements may equally be dedicated hardware devices.

Although the present invention has been described with respect to detailed embodiments, these are only described for illustrative purposes, and the invention is defined by the appended claims. Reference numerals in the claims only serve to make the claims easier to read but do not have any limiting effect.

The invention claimed is:

1. A method for congestion response in a communication system that comprises routing capability over a first type network and a second type network, comprising:

generating, in a Media Gateway, a congestion indication for resources on a first route to a target through the first type network, generating, in the Media Gateway, a partial congestion notification for resources on a second route to a target through the first type network, receiving the congestion indication, storing the congestion indication as associated to the first route, receiving the partial congestion notification, marking the second route associated with said partial congestion notification with a traffic diversion level, where a percentage of calls, corresponding to the traffic diversion level, that are addressed to said partially congested second route, use alternative routes, and upon receiving a subsequent request for initiating a set-up of a call:

checking if a congestion indication exists for a route initially associated with the requested call, and establishing the call on an alternative route to the target through the second type network if said congestion indication exists.

2. The method of claim 1, wherein said first type network is a packet switched network and said second type network is a circuit switched network.

3. The method of claim 1, wherein said first type network is one of an Internet Protocol network and said second type network an Asynchronous Transfer Mode network.

4. The method of claim 1, wherein said second type network is a Time Division Multiplex network.

5. The method of claim 1, wherein establishing the call on an alternative route is performed in a call control server of said communication system.

6. The method of claim 5, wherein said call control server receives said congestion indication from a further call control server.

7. The method of claim 1, where said congestion indication is generated if one or both of a congestion status at a user plane and a loss of connectivity between the user plane and a control plane is identified.

8. The method of claim 7, wherein said Media Gateway is a user plane handling node.

9. The method of claim 8, wherein said congestion indication is generated in the Media Gateway if, one or more of, an Internet Protocol connection request is rejected by a Measurement Based Admission Control function, an Internet Protocol connection request is rejected by a Static Admission Control function, and a User Plane Nb framing protocol can not be correctly initialized.

10. The method of claim 7, wherein generating said congestion indication comprises the steps of:

receiving a request for initiating a set-up of a call on a route to said target through said first type network, seizing resources for a bearer of the call, and determining a congestion when seizing said resources.

11. The method of claim 1 wherein said partial congestion status identification procedure comprises identifying a partial congestion status if an observed packet loss ratio exceeds a predefined limit.

12. The method of claim 1 wherein predetermined intervals are monitored, and at each expiration of one of said intervals the traffic diversion level is updated.

13. A call control server for a communication system comprising routing capability over a first type network and a second type network, comprising:

a receiver for receiving a congestion indication, generated in a Media Gateway, for resources on a first route to a target through the first type network, and for receiving a partial congestion notification, generated in a Media Gateway, for resources on a second route to a target through the first type network a memory for storing the congestion indication associated to the route, and a controller configured to mark the second route associated with said partial congestion notification with a traffic diversion level, such that a percentage of calls, corresponding to the traffic diversion level, that are addressed to said partially congested second route, use alternative routes, and the controller being arranged such that upon receiving a subsequent request for initiating a set-up of a call on the route, the controller:

checking if a congestion indication exists for a route initially associated with the requested call, and establishing the call on an alternative route to the target through the second type network if said congestion indication exists.

\* \* \* \* \*

UNITED STATES PATENT AND TRADEMARK OFFICE
CERTIFICATE OF CORRECTION

PATENT NO. : 8,774,005 B2
APPLICATION NO. : 13/121014
DATED : July 8, 2014
INVENTOR(S) : Yamen et al.

It is certified that error appears in the above-identified patent and that said Letters Patent is hereby corrected as shown below:

In the Specification

Column 2, Line 6, delete "aver" and insert -- over --, therefor.

Column 2, Line 12, delete "call" and insert -- a call --, therefor.

Column 3, Line 40, delete "distributed" and insert -- or distributed --, therefor.

Column 4, Line 17, delete "set-up" and insert -- a set-up --, therefor.

Column 5, Line 4, delete "Protocol, network" and insert -- Protocol network --, therefor.

Column 5, Line 32, delete "GCS 401," and insert -- CCS 401, --, therefor.

Column 5, Line 54, delete "shown, in" and insert -- shown in --, therefor.

Column 5, Line 55, delete "both T1" and insert -- both of T1 --, therefor.

Column 6, Line 24, delete "MSWs" and insert -- MGWs --, therefor.

Column 6, Line 37, delete "signalling" and insert -- signalling. As an example, possible protocols on the signalling --, therefor.

Column 7, Line 9, delete "heeds" and insert -- needs --, therefor.

Column 7, Line 40, delete "again" and insert -- will again --, therefor.

Column 7, Line 63, delete "it" and insert -- in --, therefor.

Signed and Sealed this
Fourteenth Day of October, 2014

Michelle K. Lee
*Deputy Director of the United States Patent and Trademark Office*

CERTIFICATE OF CORRECTION (continued)
U.S. Pat. No. 8,774,005 B2

Column 8, Line 24, delete "plans" and insert -- plane --, therefor.

Column 9, Line 11, delete "en" and insert -- an --, therefor.

Column 9, Line 15, delete "TDL," and insert -- TDL --, therefor.

Column 9, Line 34, delete "cute" and insert -- route --, therefor.

Column 10, Line 5, delete "Manager" and insert -- manager --, therefor.

Column 10, Line 24, delete "is" and insert -- a --, therefor.

Column 10, Line 44, delete "congestion" and insert -- a congestion --, therefor.

Column 10, Line 51, delete "such" and insert -- such, --, therefor.

In the Claims

Column 12, Line 13, in Claim 11, delete "claim 1" and insert -- claim 1, --, therefor.

Column 12, Line 17, in Claim 12, delete "claim 1" and insert -- claim 1, --, therefor.